United States Patent [19]

Peterson et al.

[11] 4,386,166
[45] May 31, 1983

[54] FOAM PREPARED FROM AN UNSATURATED POLYESTER RESIN COPOLYMERIZATION MONOMER, LOW MOLECULAR WEIGHT POLYOL, AND ISOCYANATE

[75] Inventors: Gregory P. Peterson, Wheaton; Alan D. Hamilton, Aurora, both of Ill.

[73] Assignee: Standard Oil Company (Indiana), Chicago, Ill.

[21] Appl. No.: 261,735

[22] Filed: May 7, 1981

[51] Int. Cl.$^3$ .............................................. C08G 18/14
[52] U.S. Cl. ...................................... 521/99; 427/373; 428/422.8; 521/108; 521/112; 521/123; 521/126
[58] Field of Search ................. 521/99, 108, 112, 123, 521/126; 427/373; 428/422.8

[56] References Cited

U.S. PATENT DOCUMENTS 3,860,537 1/1975 Graham et al. ........................ 521/55
3,886,229 5/1975 Hutchinson et al. .................. 525/28

*Primary Examiner*—Maurice J. Welsh
*Attorney, Agent, or Firm*—Robert R. Cochran; William T. McClain; William H. Magidson

[57] ABSTRACT

A process of producing a modified polyester foam having a density of 0.5 to 40 pounds per cubic foot comprising mixing on a weight basis a polyol composition A comprising
unsaturated polyester resin dissolved in a copolymerizable monomer containing 30–80% nonvolatile matter on a weight basis,
at least one urethane reaction catalyst,
at least one polyisocyanate trimerization catalyst,
at least one organic compound functional as a peroxide decomposition catalysty,
at least one low molecular weight polyol, and
at least one silicone surface active agent, and an isocyanate composition B comprising a polyisocyanate,
at least one organic peroxide functional as an unsaturated polyester resin curing catalyst, and
a urethane reaction catalyst,
at least one of compositions A and B containing a blowing agent,
and allowing said mixture to cream and foam as a result of the heat generated by the trimerization of the polyisocyanate and the urethane reaction between isocyanate groups and hydroxyl groups in the polyols and unsaturated polyester, said heat being sufficient to cause gas generation from the blowing agent and cross-linking of the unsaturated polyester with the copolymerizable monomer.

The products of the invention are especially suitable as foam board useful in building insulation.

10 Claims, No Drawings

FOAM PREPARED FROM AN UNSATURATED POLYESTER RESIN COPOLYMERIZATION MONOMER, LOW MOLECULAR WEIGHT POLYOL, AND ISOCYANATE

BACKGROUND OF THE INVENTION

This invention relates to a new foam product suitable for use as insulation in the building industry. Involved are resin systems which have been previously investigated but not used together in the system disclosed herein. One of these systems is based upon the urethane formation reaction wherein an isocyanate is reacted with a compound containing hydroxyl groups. A second reaction involved is the trimerization of isocyanates, a reaction used in the production of polyisocyanurate products. Finally, a third reaction involved is the curing of an unsaturated polyester resin with a cross-linking vinyl monomer in the presence of a free radical catalyst. The present invention combines these reactions in a manner not previously utilized by mixing two or more reactant streams in the manner to be fully described hereinafter.

One example of such prior operation is Graham et al., U.S. Pat. No. 3,860,537 (1975) where a stepwise reaction is used. In the system disclosed in that patent, a mixture of polyurethane precursors comprising a polyol and a polyisocyanate is mixed with polyester resin precursors comprising an unsaturated polyester and an unsaturated monomer. These mixtures of precursors are mixed and partially cured so that the precursors in the mixture react such that the mixture of the polyfunctional compound and the ethylenically unsaturated polyester are substantially reacted with the polyisocyanate, and the ethylenically unsaturated polyester and the unsaturated monomer are substantially uncopolymerized. The patent describes subsequently carrying out the second polymerization. In the system disclosed herein, all of the reactions take place at substantially the same time.

Additional work in the field is represented by Hutchinsen et al., U.S. Pat. No. 3,886,229 (1975) although this patent does not disclose foam products. In the system of Hutchinson et al., as in Graham et al., a polymeric product is formed by mixing precursors of a polyurethane comprising at least one diisocyanate and at least one difunctional compound with a second component comprising precursors of a cured polyester resin comprising an unsaturated polyester and at least one monomer copolymerizable with the unsaturated groups in the polyester. It will be apparent from the description of the invention disclosed herein that different preliminary mixtures are made prior to the mixing and reaction of the various ingredients.

In view of the above, it is an object of this invention to provide a new system for the production of a new insulating foam board.

A further object of this invention is to provide an insulating foam board based on an unsaturated polyester resin, which is capable of high filler loadings.

A further object of the invention is to provide an insulation foam board having a flame spread less than 50, preferably less than 25, and smoke generation less than 450 in the ASTM E84 test.

Other objects and advantages of the present invention will be apparent to those skilled in the art upon reading this disclosure.

SUMMARY OF THE INVENTION

Broadly, the present invention resides in a process of producing a modified polyester foam having a density of 0.5 to 40 pounds per cubic foot comprising mixing on a weight basis a polyol composition A comprising unsaturated polyester resin dissolved in a copolymerizable monomer containing 30–80% nonvolatile matter on a weight basis, at least one urethane reaction catalyst, at least one polyisocyanate trimerization catalyst, at least one organic compound functional to aid in the decomposition of peroxide, at least one low-molecular weight polyol, at least one silicone surface active agent and an isocyanate composition B comprising a polyisocyanate, at least one organic peroxide functional as an unsaturated polyester resin curing catalyst, a urethane reaction catalyst, at least one of composition A and B containing a blowing agent and allowing said mixture to cream and foam as a result of the heat generated by the trimerization of the polyisocyanate and the urethane reaction between isocyanate groups and hydroxyl groups in the polyol and unsaturated polyester, said heat being sufficient to cause gas generation from the blowing agent and cross-linking of the unsaturated polyester with the copolymerizable monomer and the product of the process. It will be noted that the blowing agent can be used in composition A or B or split between the compsitions or added as a third stream or Composition C. Viscosity considerations determine the blowing agent distribution when using a material which is liquid under the conditions of mixing such as a halogenated hydrocarbon.

It will be apparent that three basic reactions are involved. These include urethane formation

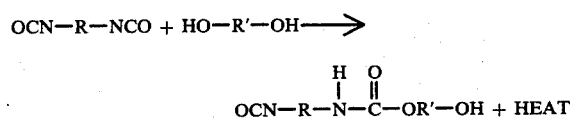

polyisocyanate trimerization

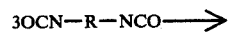

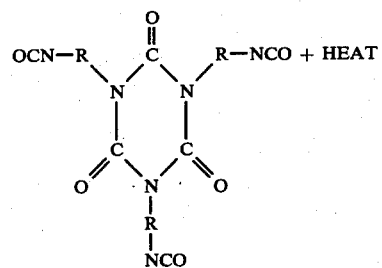

and unsaturated polyester cross-linking

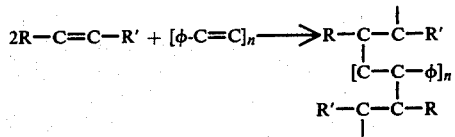

The present foams as pointed out above, are produced by mixing two compositions containing specified materials. The resulting foam products are superior to foam insulation now widely used. The polyurethane foams are flammable products and are not suitable for high inorganic filler loadings as are the products described herein. Specifically, at filler loadings high enough for flame retardancy, the urethane foams have high density, are friable, and have poor insulation properties due to the open cell structures. Polyisocyanurate foams are expensive because of the isocyanate component and are highly friable. Furthermore, the reaction is difficult to control. Polystyrene foams have problems withstanding elevated temperatures, have comparatively low R values, and have poor solvent resistance.

While considerable variation can be present in the compositions used to produce these foam products, a preferred range of materials for these products has been developed. Thus, a more specific embodiment of the invention resides in a process of producing a modified polyester foam having a density of 0.5 to 40 pounds per cubic foot comprising mixing, on a weight basis, 0.2 to 4.4, preferably 1.9 to 2.9 parts of polyol composition A comprising:

| | Parts |
|---|---|
| unsaturated polyester resin dissolved in styrene containing 30 to 80% nonvolatile matter | 100 |
| organic cobalt salt solution containing 12% cobalt | 0.1 to 1.5 |
| organic potassium salt solution containing 15% potassium | 0.05 to 8 |
| triethylene diamine | 0–5 |
| N,N',N''—tris(dimethylaminopropyl)-symhexahydrotriazine | 0–5 |
| ethylene glycol | 1.7–25 |
| diethylene glycol | 1.7–25 |
| glycerol | 1.7–25 |
| O,O—diethyl-N,N—bis (2-hydroxyethyl) amino-methyl phosphonate | 0–40 |
| hydrated alumina | 0–150 |
| trichlorofluoromethane | 20–50 |
| silicone-glycol polymer | 0.5–4 |
| and one part of a polyisocyanate composition B comprising polymethylene polyphenylisocyanate having a functionality of 1 to 4 | 110 |
| 2,5-dimethyl-2,5-bis (2-ethylhexanoylperoxy) hexane | 0.2–4 |
| dimethyl tin dimercaptide | 0.1–1 | and allowing said mixture to cream and foam as a result of the heat generated by the trimerization of the polyisocyanate and the urethane reaction between isocyanate groups and hydroxyl groups in the polyols and the unsaturated polyester, said heat being sufficient to cause gas generation from the blowing agent and cross-linking of the unsaturated polyester with the styrene and the products of the process. As stated above, the trichlorofluoromethane can be used in the polyisocyanate composition B. The cream time should be 15±10 seconds.

The unsaturated polyesters are the reaction product of one or more polycarboxylic acids and one or more polyhydric alcohols. One or more of the components of the polyester must be ethylenically unsaturated, preferably the polycarboxylic acid component. Typical unsaturated polycarboxylic acids include dicarboxylic acids such as fumaric acid, maleic acid, maleic anhydride, itaconic acid, citraconic acid, etc. Of these maleic anhydride and fumaric acid are preferred. Typical saturated polycarboxylic acids include dicarboxylic acids, such as phthalic acid, isophthalic acid, succinic acid, adipic acid, suberic acid, sebacic acid, azelaic acid, etc. Typical polyhydric alcohols include glycols, such as ethylene glycol, diethylene glycol, triethylene glycol, tetraethylene glycol, propylene glycol, dipropylene glycol and hexylene glycol; triols, such as glycerol, trimethylol ethane, trimethylol propane and hexane triol; pentaerythritol; etc.

The ethylenically unsaturated polyester is usually a flexible polyester or a semi-rigid polyester although mixtures of these may be used with rigid polyesters. Flexible polyesters form copolymerizates with vinylidene monomers (preferably styrene) having an elastic modulus of from about 10 to about 10,000 p.s.i. while semi-rigid polyesters form copolymers having an elastic modulus of from about 10,000 to 150,000 p.s.i. In addition, rigid polyesters, which form copolymerizates having an elastic modulus of from 150,000 to 600,000 p.s.i. can be used in addition to the flexible and semi-rigid polyesters. Generally, the non-rigid polyesters contain from about 95–50 mole percent saturated dicarboxylic acid and correspondingly 5–50 mole percent alpha, beta-ethylenically unsaturated dicarboxylic acid, while the polyhydroxy component is principally a glycol. Usually the longer the chain length of the glycols or saturated dicarboxylic acid components making up the polyester the more flexible the polyester. Aromatic components (which are considered saturated materials for the purpose of this invention), particularly phthalic acid, are not as effective as long chain saturated aliphatics in lowering the elastic modulus of a copolymer. However, the low cost of phthalic acid usually makes it a desirable component.

The ethylenically unsaturated polyester component comprises from about 30 to 80 weight percent of the in situ polymerizable resin-forming components. The remaining 70 to 20 weight percent of the polyester component comprises a cross-linking vinylidene monomer selected from vinyl aromatics, such as vinyl toluene, styrene, alpha-methyl styrene, divinyl benzene, dichlorostyrene, alkyl esters of alpha, beta-ethylenically unsaturated monocarboxylic acids, such as methyl methacrylate, methyl acrylate, ethyl acrylate and 2-ethylhexyl acrylate, vinyl esters such as vinyl acetate and propionate. The preferred vinylidene monomers are styrene and vinyl toluene. If desired, various other difunctional materials such as diallyl phthalate and trialkyl cyanurate can be added to the composition.

Urethane reaction catalysts are well known. The chain-extension reaction, where the polyol reacts with the isocyanate to produce the polyurethane, is accelerated by tertiary amines, especially when they contain a metal co-catalyst. Suitable tertiary amines include triethylene diamine, tetramethyl butane diamine, triethylamine, n-methyl morpholine, N-ethyl morpholine, diethyl ethanolamine, N-coco morpholine, 1-methyl-4-dimethylamine ethyl piperazine, 3-methoxy-N-dimethyl propyl amine, N-dimethyl-N'-methyl isopropyl propylene amine, N,N-diethyl-3-diethyl amino propyl amine, and dimethyl benzyl amine. Suitable metal co-catalysts for carrying out the urethane formation are: organometallic compounds of copper, tin, zinc, lead, mercury, cadmium, bismuth, cobalt, manganese, antimony, iron and the like such as, for example, metal salts of carboxylic acids having from about 2 to about 20 carbon atoms including for example stannous octoate, stannous chloride, dimethyl tin mercaptide, dibutyl tin dilaurate, dibutyl tin diacetate, dibutyl tin di-2-ethyl hexoate, ferric acetyl acetonate, lead octoate, lead oleate, cobalt naphthanate, lead naphthanate, mixtures thereof and the like. It is preferred that the catalysts be employed in liquid form. Those catalysts which are not ordinarily liquids may be added as a solution in solvent.

One group of polyisocyanate trimerization catalysts is tertiary amines examples being triethylamine, N,N',N''-tris(dimethylaminopropyl)hexahydrotriazine, 2,4,6-tris(dimethylaminomethyl)phenol, and tetramethyl ethylenediamine.

Another polyisocyanate trimerization catalyst system is a three component one firstly including an amine salt, preferably a quaternary ammonium compound such as the DABCO TMR line of catalysts from Air Products and Chemicals of Allentown, Pa. Specific examples include DABCO TMR and DABCO TMR-2 which are amine salts, particularly quaternary ammonium compounds, suspended in a high boiling organic solvent such as a glycol. For example, DABCO TMR-2 is a liquid composition of the N-hydroxypropyl trimethyl ammonium salt of formic acid, which has a hydroxyl number of 685 in a glycol having an ammonia-like odor, a boiling point of about 250° F., a specific gravity of 1.055 at 25° C. and a pH in a 3% aqueous solution of about 6.5.

A second catalyst component that can be used in addition to the amine salt catalyst is a metal carboxylate. Examples include metal salts of aromatic carboxylic acids such as lead naphthoate and metal salts of aliphatic carboxylic acids such as potassium acetate. More specific examples include alkali metal salts of aliphatic monocarboxylic acids having up to 30 carbon atoms. Preferably, the metal salt is potassium 2-ethylhexoate, otherwise known as the octoate, which may be obtained as a mixture with a solvent carrier. Thus, the T-45 catalyst material sold by M&T Chemicals, Ind., of Rahway, N.J. is a 65% solution of potassium 2-ethylhexoate in polypropylene glycol having a 14% K content and a glycol hydroxyl number of 265 and may be used in the invention in an amount ranging from 0.05 to 8% by weight of all starting ingredients. Further, DM-9556 sold by M&T Chemicals, which is T-45 diluted with polypropylene glycol to 10% K, may be used. Other metal carboxylates include those of tin and a mixture of tin and potassium. Examples of these materials include the CNF line sold by M&T Chemicals. Specifically, CNF-576 has potassium and tin contents of 10.3% and 1.5% by weight, respectively. CNF-667 has potassium and tin contents of 6.9 and 7.8% by weight, respectively. Both of these have diluent carriers having hydroxyl numbers of 265.

A third catalyst component which can be used in conjunction with the two described above is a dimethylaminomethyl-substituted phenol based compound. Thus, the DMP line of catalysts sold by the Rohm and Haas Company of Philadelphia, Pa. are examples. Specific examples include DMP-10 and DMP-30 which is the Rohm and Haas brand of 2,4,6-tris(dimethylaminomethyl)phenol.

Representative compounds which supply the metal ions to aid in the decomposition of the peroxide include salts and acetylacetonates of potassium, cobalt, copper, vanadium, manganese and lead, etc. These accelerators should be soluble in the polyester mixture with common commercial products being octoates and naphthenates.

Single low-molecular weight polyols can be used, but it is preferred to use a mixture of these since different polyols contribute different properties to the foam product. Examples include at least ethylene glycol, diethylene glycol, dipropylene glycol, glycerol, etc. Ethylene glycol reacts rapidly and produces a very rigid foam. As the length of carbon chain increases, as in diethylene glycol, increased flexibility of the foam results. Compounds such as glycerol with its trifunctionality serve to cause further cross-linking within the product.

Typical blowing agents include (a) inert solvents having low boiling points such as trichloromonofluoromethane, dichlorodifluoromethane, dibromotetrafluoroethane, trichlorotrifluoroethane, methylenechloride, pentane, trichloroethane, benzene, n-hexane and the like; (b) compounds which generate carbon dioxide by reacting with an isocyanate such as water, hydrated water containing compounds, nitroalkanes, aldoximes, acid amides, enolizable compounds and the like; (c) compounds which generate gas by thermal decomposition by the heat or reaction provided in the formation of the foam such as sodium bicarbonate, ammonium bicarbonate, azobisisobutyronitrile, azoaminobenzol, dinitrosopentamethylenetetramine and the like. The preferable blowing agents are the compounds included in group (a) and the optimum blowing agent is trichloromonofluoromethane. For insulation foam, group (b) compounds are least desirable because their use results in an open-celled foam. Preferably the system is essentially water free or as near as possible to this condition.

The silicone surfactants found to be useful to the present invention to ensure entrapment and uniform dispersion of gaseous products include the silicone-oxyalkylene block copolymers that fall into two classes, depending upon the nature of the linking group between the organosiloxane and the oxyalkylene portion of the molecule. Thus, the silicone surfactants are characterized as hydrolyzable where the moieties are joined by a silicone-oxygen-carbon bond and nonhydrolyzable where the bond is silicon-carbon. Concentrations in the amount of about 1% by weight have been found satisfactory, with a practical useful range being about 0.5–4% by weight.

Silicone surfactants are available under a number of trade names known to those skilled in this art. Some of the silicone surfactants particularly useful for this invention are Union Carbide's L-520, L-532, L-550, L-5340, L-5350, L-5430, L-5710, L-5410 and L-5420; General Electric's SF-1066; and Dow Corning's 193, 195, 197, 190 and Q2-5098.

Inorganic fillers useful in the foam include mica powders, finely divided clay powders, calcium carbonate, fumed silica, aluminum hydroxide, aluminum trihydrate, calcium hydroxide, magnesium hydroxide, gypsum, sodium silicate and the like. The above described additives are conveniently used within the range of 0 to 150, preferably 80 to 125 parts by weight based on 100 parts by weight of the unsaturated polyester/unsaturated monomer mixture in the foam forming composition. Optionally the products can be reinforced with glass fiber materials.

As to the aromatic polyisocyanates, mention may be made of tolylene diisocyanate, (2,4- and/or 2,6-isomer), diphenylmethane diisocyanate, ditolylene diisocyanate, naphthalene diisocyanate (for example, 1,5-naphthalene diisocyanate), triphenylmethane triisocyanate, anisidine diisocyanate, xylylene diisocyanate, tris(isocyanatrophenyl)thiophosphate, mixture of a polymethylene polyphenylisocyanate shown by the following general formula (so-called crude MDI or polymeric isocyanate)

obtained by reaction of low polycondensate of aniline and formaldehyde with phosgene,

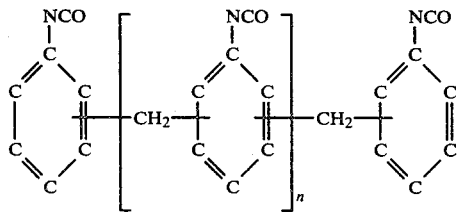

Diacyl peroxides are normally used with amines and mercaptans as accelerators, while metal salts are used with the peroxyesters and ketone peroxides. Examples of diacyl peroxides include 2,4-dichlorobenzoyl peroxide, benzyol peroxide, diisobutyryl peroxide, diisononanoyl peroxide, decanoyl peroxide, lauroyl peroxide, acetyl peroxide and succinic acid peroxide. Representative peroxyesters include t-butyl peroxybenzoate, t-butyl peroxy-2-ethylhexanoate, t-butyl peroxypivalate, t-butyl peroxyneodecanoate, t-butyl peroxymaleic acid, di-t-butyl diperoxyphthalate, t-butylisopropyl monoperoxycarbonate, 2,5-dimethyl-2,5-bis(2-ethylhexanoylperoxy)hexane, and 2,5-dimethyl-2,5-bis(benzoylperoxy)hexane. Ketone peroxides include methyl ethyl ketone peroxide, hydroxyheptyl peroxide, and 2,4-pentanedione peroxide. The peroxy esters are preferred and these should be undiluted since diluents interfere with the reaction.

Where colored products are desired, dyes can be added, but these do not form a part of the present invention.

Fire retardants in addition to the hydrated fillers previously mentioned include reactive and non-reactive phosphorous compounds including halogen containing phosphorous compounds, mixtures of halogenated compounds and metal derivations. Phosphorous compounds include O,O-diethyl-N,N-bis(2-hydroxyethyl)amino methylphosphonate (Fyrol 6), lithium orthophosphate, tris(2-chloroethyl)phosphate, tris(beta-chloropropyl)phosphate, dimethyl(2-chloroethyl)vinylphosphate. Halogenated compounds include dibromostyrene, chlorinated paraffins (Chlorowax 200), dibromobutane diol, tetrabromo phthalate, etc. When the fire retardant contains a substantial hydroxyl component, the retardant can replace a part of the polyol.

Insulating foamboard of this invention is normally 0.25 to 4 inches thick with 1 inch being most common. Also panel size is usually 4 by 8 feet.

Normally, foam products of this type are prepared with a facia as a part of the manufacturing process and to protect the foam. Various paper-foil components have been used in this area, and a 1-mil thick epoxy coating aluminum foil used in the Example has been found especially suitable.

The following example illustrates specific embodiments of the invention, but should not be considered unduly limiting.

EXAMPLE

Formulations were prepared using the following recipes:

| RUN NO. | 1 | 2 | 3 | 4 |
|---|---|---|---|---|
| POLYOL SIDE | | | | |
| Unsaturated polyester resin in styrene (70% NVM) acid number 13 hydroxyl number 50 molecular weight 2825 | 100 | 100 | 100 | 100 |
| cobalt naphthenate | 0.125 | 0.125 | 0.125 | 0.125 |
| Potassium Hex-Cem (Mooney Chemical Co.) | 0.25 | 0.25 | 0.25 | 0.25 |
| Polycat 9 (triethylene diamine) | 1.0 | 1.0 | 1.0 | 1.0 |
| Polycat 41 (N,N',N''—tris(dimethylaminopropyl)-symhexahydrotriazine) | 1.0 | 1.0 | 1.0 | 1.0 |
| Ethylene Glycol | 5.0 | 5.0 | 5.0 | 5.0 |
| Diethylene Glycol | 5.0 | 5.0 | 5.0 | 5.0 |
| Glycerol | 5.0 | 5.0 | 5.0 | 5.0 |
| Hydrated Alumina (Alcoa C331) | 100 | 100 | 100 | 100 |
| Freon 11-B (trichloromonofluoromethane) | 40 | 40 | 40 | 40 |
| DC-197 surfactant | 2.0 | 2.0 | 2.0 | 2.0 |
| Fyrol 6 (O,O—diethyl-N,N—bis(2-hydroxyethyl)amino-methyl phosphonate) | 4.0 | 6.0 | 6.0 | 6.0 |
| Freon 113 (1-dichloro-1-fluoro-2-chloro-2-difluoroethane) | — | — | — | 10.0 |
| ISO SIDE | | | | |
| Mondur MR (polymethylene polyphenylisocyanate having a functionality of 2.7) | 100 | 100 | 90 | 100 |
| UL-24 (dimethyl tin mercaptide) | 0.5 | 0.5 | 0.5 | 0.5 |
| Lupersol 256 (2,5-dimethyl-2,5-bis(2-ethylhexanoylperoxy hexane) | 2.0 | 2.0 | 2.0 | 2.0 |
| Mix Ratio (Polyol/ISO) | 2.57:1 | 2.59:1 | 2.87:1 | 2.68:1 |

The one-inch thick foam was made using a Kornylak air bearing conveyor-laminator foamboard machine designed for producing polyurethane foam with a Martin-Sweets Flexomatic 100 wet end supply system. In the Kornylak machine, the top and bottom conveyor faces are made of ground steel plates with many small air holes set in a fully covering grid pattern. Preheated air is forced through the holes to heat and float the board down the conveyor. Temperatures in these runs ranged from 170° to 220° F. The thickness of the foam is controlled by the spacing of the perforated plates, as the foam rises to meet the top plate; the air flow through the holes is restricted. Thus, the air pressure increases to hold the foam lightly away from the surface of the ground steel plates. The line speed was approximately 20 feet per minute, being limited by the length of the conveyor-laminator. Lengthening the conveyor gives higher line speed. A good quality mark-free board was produced in each run. The Martin-Sweets wet end system is a three-component pumping system with mass flow meters and includes a traversing system, calender roll, leveling table, and hydraulically powered mixing head. The liquid components were kept at a temperature of 68° F. prior to mixing and dispensing onto the lower facia. Physical properties of these foams are shown in the following table:

| RUN NO. | 1 | 2 | 3 | 4 |
|---|---|---|---|---|
| Insulative K Value (Btu/ft$^2$ hr °F./in) ASTM C177 | 0.12–0.13 | 0.13 | 0.15–0.16 | 0.12–0.15 |
| Percent Closed Cells ASTM D2856-70 | 84–87 | 96–99 | 95–97 | 94 |
| Crush Strength, PSI ASTM D1621-73 | 22.5–27 | 24–32 | 24–25 | 12.5–14.8 |
| Density, PCF ASTM D1622-70 | 2.95–2.98 | 2.72–2.89 | 2.69 | 1.87–1.92 |
| Dim. Stability, 70° C., ASTM D2126-71 100% RH-14 days | | | | |
| with foil | 4.3 | 5.5 | 4.1 | 4.5 |
| Without foil | 7.5–20.5 | 11.5–22.7 | 14.1–15.6 | 13.5–17.0 |

Fire test data using the ASTM E-84-75 tunnel test are shown in the following table on the faced, slit, and unfaced board.

| | FIRE TEST DATA | | | | |
|---|---|---|---|---|---|
| | FLAME SPREAD | | | FUEL | |
| | FACED | SLIT | UNFACED | CONT. | SMOKE |
| RUN 1 | 41 | | | −12.8 | 219 |
| | | 43 | | −13.2 | 170 |
| | | | 36 | −4.1 | 139 |
| RUN 2 | 40 | | | −12.1 | 217 |
| | | 25 | | −13.1 | 149 |
| | | | 28 | −9.1 | 136 |
| RUN 3 | 30 | | | −5.9 | 145 |
| | | 43 | | −9.5 | 175 |
| | | | 26 | −8.2 | 149 |
| RUN 4 | 22 | | | −10.9 | 138 |
| | | 25 | | −16.2 | 121 |
| | | | 41 | −7.2 | 78 |

At least three other systems are available for board production, one being the slat board laminator which is currently the most widely used system in the rigid foam industry. It involves the use of two conveyor belts, one placed atop the other. The foamable chemicals are placed between rigid or flexible facings which are then fed into the gap between the conveyor belts. The foam rises to fill the gap between the belts. The belts are generally constructed of 3–10" wide by 4' long slats of steel or aluminum, these slats being interlocked to form an endless belt. The slats ride on either ball or roller bearings. These slat belts are driven by a large variable speed motor and gear assembly. The typical length for a slat board laminator is 60 feet and it usually operates at between 40 to 60 feet per minute belt speed. The product that is produced is often of very high quality and of even thickness; however, the surface of the finished board is sometimes marked with lines or ridges that correspond to the linkage lines of the slats. Should heating or cooling of the foam board be needed, this is accomplished by introducing conditioned air to the interior sections of each conveyor.

Another system is the free rise laminator composed of an accurate foam chemicals lay down section and a calender roll to spread the liquid chemicals evenly between the foil facers. The foam is then allowed to rise with no top constraint in a long oven. The foam exits the oven, is allowed to cool slightly, and is cut in lengths and side trimmed. The laminate board that is produced is of good quality and excellent in appearance. However, the major drawback of the system is the uneven thickness of the finished board.

Finally, there is the precision nip roll laminator, which is a modification of the free rise system. The laminator is exactly the same except thickness control of the board product is maintained by passing the faced-board between accurately spaced nip rollers as it is curing in the oven. The nip rolls are usually driven at a face speed that is equal to the foamboard line speed thus propelling the foam through the system. The unevenness in thickness is massaged out of the board before it fully cures. This system is preferred for the production of foam of the present invention.

In addition to the laminators described, the foam can be made in closed molds such as pour-in-place building insulation.

Although specific embodiments of the invention have been set forth, it will be obvious to those skilled in the art that considerable modification can be made within the spirit and scope of the invention.

We claim:

1. A process of producing a modified polyester foam having a density of 0.5 to 40 pounds per cubic foot comprising mixing on a weight basis a polyol composition A comprising
    unsaturated polyester resin dissolved in a copolymerizable monomer containing 30–80% non-volatile matter on a weight basis,
    at least one urethane reaction catalyst,
    at least one polyisocyanate trimerization catalyst,
    at least one organic compound functional as a peroxide decomposition catalyst,
    at least one low molecular weight polyol, and
    at least one silicone surface active agent, and an isocyanate composition B comprising a polyisocyanate,
    at least one organic peroxide functional as an unsaturated polyester resin curing catalyst, and
    a urethane reaction catalyst,
    at least one of compositions A and B containing a blowing agent,
and allowing said mixture to cream and foam as a result of the heat generated by the trimerization of the polyisocyanate and the urethane reaction between isocyanate groups and hydroxyl groups in the polyols and unsaturated polyester, said heat being sufficient to cause gas generation from the blowing agent and cross-linking of the unsaturated polyester with the copolymerizable monomer.

2. The process of claim 1 wherein said blowing agent comprises a portion of Composition A.

3. The process of claim 2 wherein said blowing agent comprises at least one halohydrocarbon.

4. The process of claim 1 wherein said foam is a sheet having a thickness 0.25 to 4 inches thick.

5. The process of claim 4 wherein a facing material is applied to upper and lower surfaces of said foam.

6. The process of claim 1 wherein an inorganic filler is incorporated in Composition A in an amount of 80 to 150 parts by weight based on one hundred parts by weight of the unsaturated polyester/unsaturated monomer mixture in the Composition A.

7. A foam product produced by the process of claim 1.

8. A process of producing a modified polyester foam having a density of 0.5 to 40 pounds per cubic foot comprising mixing, on a weight basis, 0.2 to 4.4 parts of polyol composition A comprising

| | |
|---|---|
| unsaturated polyester resin dissolved in styrene containing 30 to 80% non-volatile matter on a weight basis, | 100 |
| organic cobalt salt solution (12% cobalt) | 0.1 to 1.5 |
| organic potassium salt solution (15% K) | 0.005 to 8 |
| triethylene diamine | 0–5 |
| N,N',N''—tris(dimethylaminopropyl)-symhexahydrotriazine | 0–5 |
| ethylene glycol | 1.7–25 |
| diethylene glycol | 1.7–25 |
| glycerol | 1.7–25 |
| O,O—diethyl-N,N—bis (2-hydroxyethyl) amino-methyl phosphonate | 0–40 |
| hydrated alummina | 0–150 |
| trichlorofluoromethane | 20–50 |
| silicone-glycol copolymer | 0.5–4 |
| and one part of an isocyanate composition B comprising polymethylene polyphenylisocyanate having a functionality of 1 to 4 | 110 |
| 2,5-dimethyl-2,5-bis (2-ethylhexanoylperoxy) hexane | 0.2–4 |
| dimethyl tin dimercaptide | 0.1–1 | and allowing said mixture to cream and foam as a result of the heat generated by the trimerization of the polyisocyanate and the urethane reaction between isocyanate groups and hydroxyl groups in the polyols and unsaturated polyester, said heat being sufficient to cause gas generation from the blowing agent and cross-linking of the unsaturated polyester with the styrene.

9. A foam product produced by the process of claim 8.

10. A process of producing a modified polyester foam having a density of 0.5 to 40 pounds per cubic foot comprising mixing
  unsaturated polyester resin dissolved in a copolymerizable monomer containing 30–80% non-volatile matter on a weight basis,
  at least one urethane reaction catalyst,
  at least one polyisocyanate trimerization catalyst,
  at least one organic compound functional as a peroxide decomposition catalyst,
  at least one low molecular weight polyol,
  at least one silicone surface active agent,
  a polyisocyanate,
  at least one organic peroxide functional as an unsaturated polyester resin curing catalyst,
  at least one urethane reaction catalyst, and
  a blowing agent,
and allowing said mixture to cream and foam as a result of heat generated by the trimerization of the polyisocyanate and the urethane reaction between isocyanate groups and hydroxyl groups in the polyol and unsaturated polyester, said heat being sufficient to cause gas generation from the blowing agent and cross-linking of the unsaturated polyester with the copolymerizable monomer.

* * * * *